Feb. 7, 1956
K. N. MOSELEY
2,733,808
LUMBER SORTER
Filed Sept. 17, 1954
2 Sheets-Sheet 1
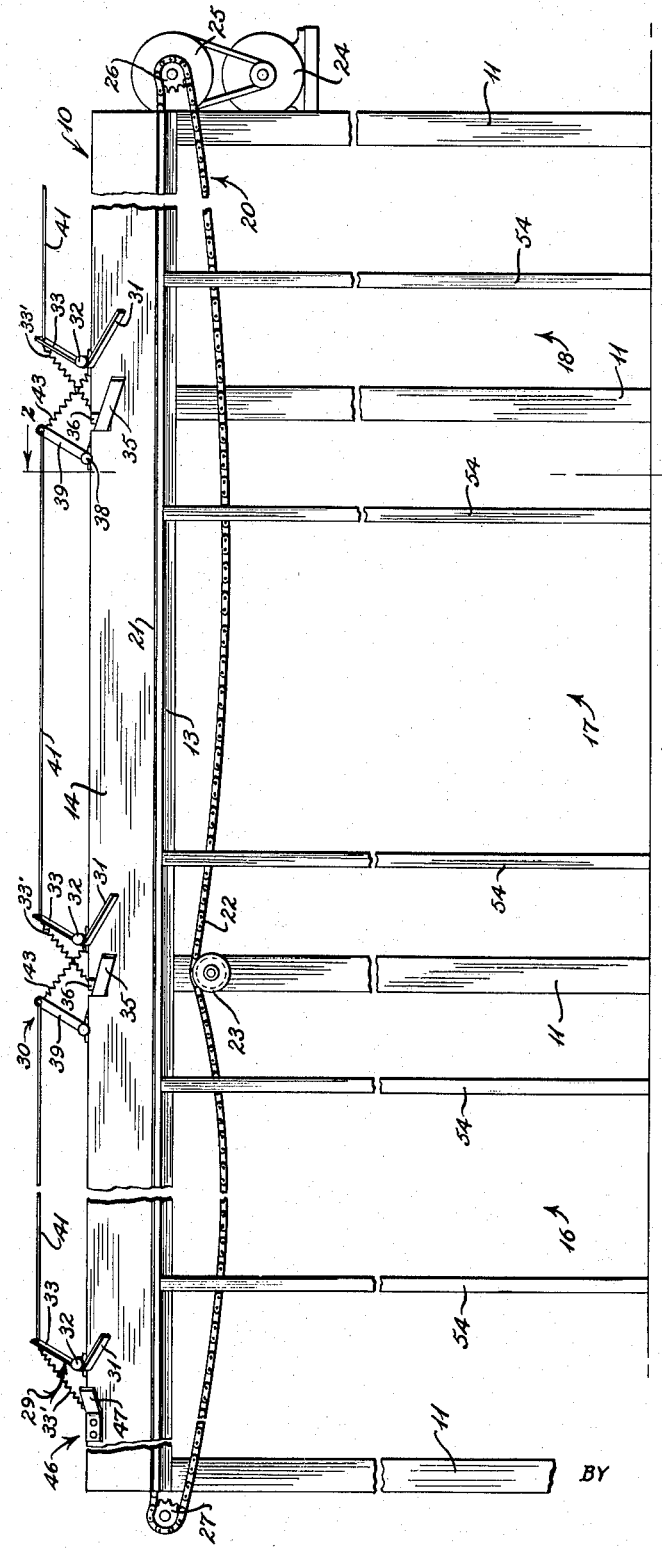
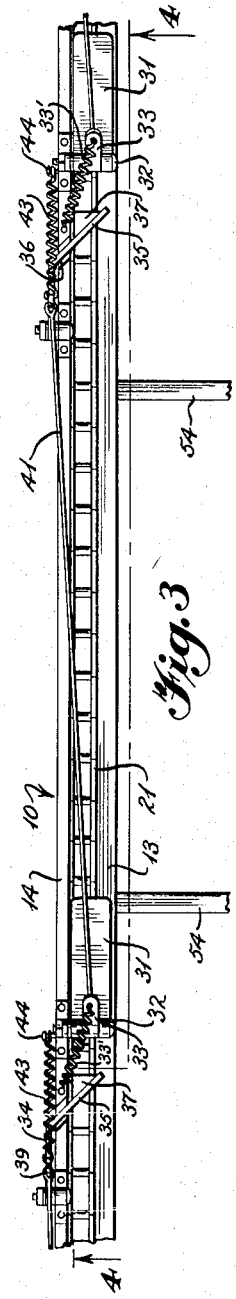
INVENTOR
*Kemper N. Moseley*
BY *A. Yates Dowell*
ATTORNEY Feb. 7, 1956 K. N. MOSELEY 2,733,808
LUMBER SORTER
Filed Sept. 17, 1954 2 Sheets-Sheet 2
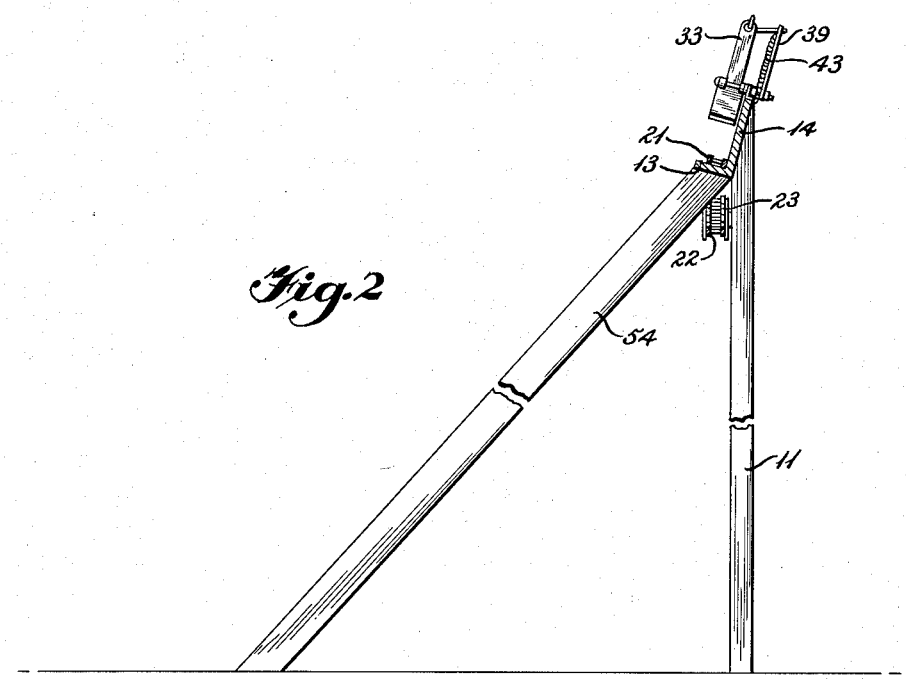
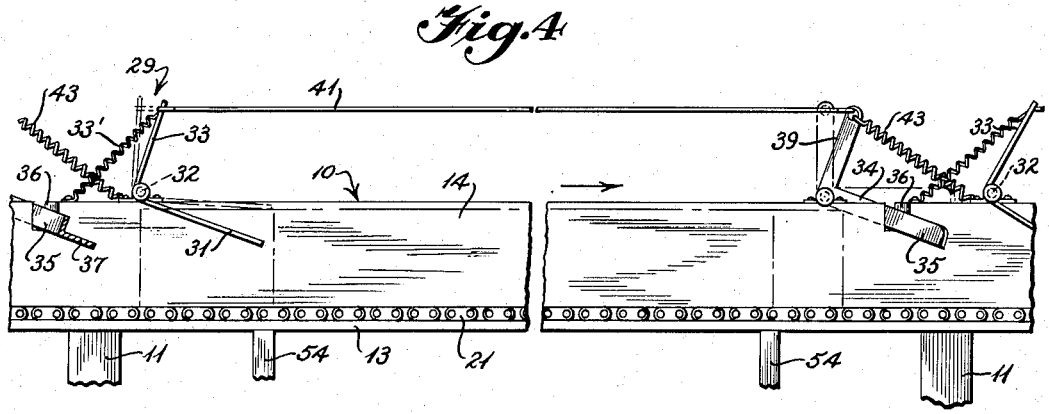
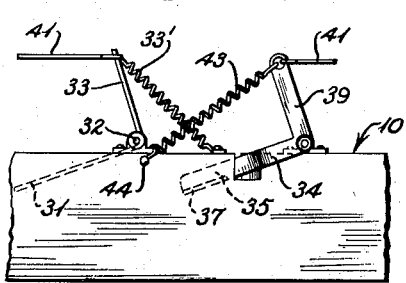
INVENTOR
*Kemper N. Moseley*
BY *A. Yates Dowell*
ATTORNEY

United States Patent Office

2,733,808
Patented Feb. 7, 1956

2,733,808

LUMBER SORTER

Kemper N. Moseley, Tifton, Ga.

Application September 17, 1954, Serial No. 456,767

5 Claims. (Cl. 209—88)

This invention relates to selection apparatus and more particularly to a device for separating lumber according to both length and width.

The separating of quantities of lumber manually is tedious and time consuming and, accordingly, efforts have been made to produce apparatus for such separation by machinery. Various types of sorters have been used but these have frequently been very expensive and have suffered from such deficiencies as becoming easily jammed or unable to properly feed the lumber.

Accordingly, it is an object of the present invention to provide a relatively inexpensive and simple lumber sorter which is not easily jammed as the result of warped lumber or the feeding of a number of pieces therethrough side by side.

A further object is the provision of a lumber sorter in which the separator mechanism assists in the maintaining of the proper feeding of the lumber through the machine.

These and other objects and advantages of the invention will be apparent from the following description taken in conjunction with the accompanying drawings wherein:

Fig. 1 is a side elevation with portions removed, illustrating one embodiment of the invention;

Fig. 2, a section on the line 2—2 of Fig. 1;

Fig. 3, a plan view of a portion of the device of Fig. 1;

Fig. 4, an elevation to an enlarged scale on the line 4—4 of Fig. 3, of a separator unit with two positions of the ejector mechanism illustrated in full and broken lines; and Fig. 5, a rear elevation, to an enlarged scale, of an ejector member and trigger.

Briefly stated, the invention includes an elongated trough having a back side which is inclined to the vertical in order that lumber within the trough may rest against the back side while being moved through the trough on its edge. An endless chain conveyor is employed which has a top run in the lower portion of the trough and on which the edges of the lumber rest. As many groups of selector units as are desired are provided along the length of the trough by positioning trip operated ejectors therealong.

Within each group the width selected is the same, and is governed by the spacing between the bottom of the trough and the trip and ejector. Length selection within a group is accomplished by varying the distance between the trips and their associated ejectors. Succeeding groups of separator units select different widths than preceding groups, although the selection within each group is according to length.

Thus, one continuous trough may include several groups within each of which several units are employed so that lumber of various lengths and widths may be fed onto the chain and ejected at the proper station.

Referring to the drawings, the lumber sorter includes a trough 10 mounted on supports 11. The trough may be of any length desired according to the range of length and width separations which is to be accomplished. The trough has a relatively narrow bottom 13 and a wider back side 14, the latter being inclined from the vertical so that a piece of lumber resting in the trough will not tend to fall out of the trough unless ejected.

Positioned along the trough are a plurality of stations 16, 17, 18, only three being represented in Fig. 1, although any desired number may be employed. For moving pieces of lumber along the trough from station to station a conveyor chain 20 is used which has an upper run 21 moving along the bottom of the trough and a lower run 22 carried by rollers 23 thereunder. A motor 24 at one end drives a sheave 25 which in turn drives a sprocket 26 with which the chain engages. At the opposite end, an idler sprocket 27 supports the chain. Other conveyor means may be used in place of the chain, if preferred.

At each of the stations a separator unit is mounted. The unit includes a first bell crank lever 29 which constitutes a trip and a second bell crank lever 30 which is the ejector member. Arm 31 of trip 29 extends downwardly a predetermined distance from the bottom of the trough, the arm being pivotally mounted at 32 on the upper edge of the trough side 14. The other arm 33 extends above the trough, the arm 33 being disposed substantially at right angles with respect to the arm 31. A spring 33' is provided to retain the arm 33 in normal position.

The ejector bell crank has a lower arm 34 with an offset ejector portion 35 extending through a notch 36 on the upper portion of the side 14 of the trough. The ejector portion 35 extends substantially transversely across the trough but at an angle thereto in order to deflect the leading edge of a piece of lumber which is moved against it. The portion 35 has at its lower edge a turned under portion or curved portion 37 so that lumber passing under portion 35 which is contacted by it will not be unnecessarily impeded in its travel. The ejector bell crank is pivotally mounted at 38 on the back of the trough side 14 and adjacent to its upper edge and has an upper arm 39 the end of which is connected by rod or line 41 to the end of arm 33, such connections permitting movement of the trip and ejector about the pivots. Spring 43 has one end connected to the upper end of arm 39 and the other anchored at 44 to the upper portion of the trough side 14.

In the operation of a separator unit such as that described, the lumber is moved in the trough by the chain from left to right as viewed in Fig. 1. Lumber of a width less than the height of the trip 31 above the chain will not engage the trip nor the ejector portion 35 and will therefore pass the station without ejection. Lumber sufficiently wide to engage trip 31 will move it upward, the bell crank 29 rotating counterclockwise and producing counterclockwise movement of the ejector bell crank 30 thereby lifting ejector member 35. If the piece of lumber is sufficiently long so that the action of the trip 29 keeps the ejector 30 raised sufficiently long for the leading end of the lumber to pass beneath the ejector before the trip 31 is released, the lumber will pass the station without being ejected. On the other hand, if ejector portion 35 drops, through the action of spring 43, before the leading end of the lumber is beneath it, the end will engage the ejector portion 35 and be deflected at the station.

In practice, the stations are grouped according to the width of lumber which is to be segregated within the group. As many units are used in each group as there are lengths of lumber of the same width to be separated. For example, stations 16 and 17 might be designed to separate lumber of 8' nominal length from lumber of 10' nominal length. Such lumber is commonly approximately 3" or 4" in excess of its nominal length at the sorting yard. The first of such units in the group, namely 16, might be designed to eject lumber of 8' length and 12" width and at station 17 to eject lumber of 10' length and 12" width. Further on succeeding stations 18, etc., which are similarly constructed, may be provided to eject lumber of greater length and of the same width. Other groups may follow the first group for separating lumber of lesser width according to length.

A fixed ejector member 46 having a portion 47 extending angularly into the trough and above the height of the first trip 31 may be provided to eject any lumber whose width exceeds the maximum for which the separator units are designed. The groups are arranged with the greater widths first and the next succeeding ones thereafter. Within each group the shortest lumber is ejected first and pieces of greater length thereafter. Thus, a series of separator units may be arranged, seriatim, to eject lumber of the following nominal lengths and widths: 8' 12", 10' 12", 12' 12", 8' 10", 10' 10", 12' 10"; 8' 8", 10" 8", 12' 8", 8' 6", 10' 6", 12' 6"; 8' 4", 10' 4", 12' 4"; etc.

The ejected lumber may be received and stacked in any desired manner at each separating unit. Spaced rails 54 are illustrated which extend from the trough 10 angularly to the ground or foundation in front of the trough for deflecting ejected lumber outwardly from the trough.

The separator, it will be observed, is relatively simple in structure and operation and is so constructed that no elements are present against which or between which the lumber may jam and thus stop operation even though warped pieces or two or more pieces side by side are attempted to be fed down the trough at the same time. Furthermore, the engagement of the lumber by the trips and the ejectors which rest on top of the lumber urge it into closer contact with the chain, thus promoting its movement.

It is contemplated that a pair of trough separators may be positioned back-to-back, one being used for lumber of one of the common thicknesses, namely 1", and the other for 2" material. Lumber may be fed to the troughs manually or by a well known automatic feeder which separates lumber according to thickness.

Accordingly, it will be understood that the invention includes a trough along which a plurality of groups of separator units are mounted, each group being adapted to separate lumber of a certain width in accordance with its length and that succeeding groups are adapted to separate lumber of successively smaller width according to its length.

Even though specific elements are shown, such as a chain drive for moving the lumber, the invention is not limited to such specific elements, but includes the use of obviously equivalent structure for accomplishing the same result.

Accordingly, it will be obvious to those skilled in the art that various changes may be made in the invention without departing from the spirit and scope thereof and therefore the invention is not limited by that which is illustrated in the drawings and described in the specifications, but only as indicated in the appended claims.

What I claimed is:

1. A lumber sorter comprising an elongated L-shaped trough in which the back is inclined at an angle to the vertical whereby lumber placed in the trough on its edge may rest against the back side of the trough, an endless conveyor chain having its upper run at the bottom of the trough and its lower run beneath the trough, driving and supporting means for the conveyor chain, and length and width responsive separating units mounted on the trough and dividing it into a plurality of separator stations, said length and width responsive separating units each comprising a first bell crank lever pivotally mounted at the top of the back side of the trough and having a first arm extending downwardly into the trough and a second arm extending above the trough, an ejector member in spaced relation from the lever, said ejector member comprising a second bell crank member pivotally mounted adjacent to the top of and behind the back side of the trough and having a first arm with an offset portion extending across the trough through a slot in the upper portion of the back side of the trough and a second arm extending upwardly, rod means connecting the second arms of the two bell crank levers, a spring connected to the second arm of the second bell crank member at one end and to the trough at the other end and tending to urge the first arms of the first and second bell crank members to the lowermost position permitted by the extent of the slot in the back side of the trough through which the first arm of the second bell crank member extends.

2. A lumber sorter comprising an elongated trough in which the back is inclined at an angle to the vertical whereby lumber placed in the trough on its edge may rest against the back of the trough, a conveyor chain having a run at the bottom of the trough, driving and supporting means for the conveyor chain, and length and width responsive separating units mounted on the trough and dividing it into a plurality of separator stations, said length and width responsive separating units each comprising a first bell crank lever pivotally mounted adjacent to the top of the trough and having a first arm extending downwardly into the trough and a second arm extending above the trough, an ejector member in spaced relation from the lever, said ejector member comprising a second bell crank member pivotally mounted on the trough and having a first arm extending across the trough and a second arm extending upwardly, means connecting the second arms of the two bell crank levers, and means urging the first arms of the first and second bell crank members to their lowermost position.

3. A lumber separator system comprising an elongated trough, conveyor means in the trough, and a plurality of separator units along the trough, each separator unit comprising a trip extending adjacent to the trough and an ejector spaced from the trip and extending adjacent to the trough and transversely thereof, means interconnecting the trip and the ejector whereby actuation of the trip moves the ejector sufficiently for lumber of a width sufficient to actuate the trip to pass the ejector, means for returning the trip and ejector to unactuated position, said separator units being ararnged in groups, all the units in a group having their respective trips and ejectors spaced apart varying distances for separating lumber of various lengths, the separator units within each group having their trips and ejectors spaced the same height above the conveyor in the trough, the spacing between the trip and the chain of succeeding groups being smaller than that of the next preceding group, the uppermost occurring first, the next highest occurring second, etc., whereby the widest lumber will be ejected at the first group, the next widest at the next group, etc.

4. A lumber separator for separating lumber according to width and length, comprising a trough along which lumber may be moved on edge, conveyor means at the bottom of the trough for moving lumber on edge therealong, a trip arm extending into the trough at a predetermined height above the conveyor means, the trip arm being movably mounted so that lumber greater than a predetermined width deflects it out of the path of movement of such lumber, means biasing the trip arm towards its undeflected position, an ejector arm extending into the trough at a predetermined distance from the trip arm and at substantially the same height above the conveyor means as the trip arm, the ejector arm being movably mounted, means connecting said trip arm to said ejector arm for moving the ejector arm out of the path of lumber of greater than a predetermined width in response to deflection of said trip arm, means biasing said ejector arm toward its operative position, said ejector arm being so constructed and arranged that lumber moving along said trough which engages said ejector arm is deflected laterally off of said conveyor.

5. A lumber separator for separating lumber according to width and length, comprising a trough along which lumber may be moved with an edge in proximity to a portion thereof, conveyor means for moving lumber therealong, a trip arm extending into the trough at a predetermined width from said portion, the trip arm being movably mounted so that lumber greater that said predetermined width deflects it out of the path of movement of such lumber, means biasing the trip arm towards its undeflected position, an ejector arm extending into the trough at a predetermined distance from the trip arm and at substantially the same width from the said portion of the trough as the trip arm, the ejector arm being movably mounted, means connecting said trip arm to said ejector arm for moving the ejector arm out of the path of lumber of greater than said predetermined width in response to deflection of said trip arm, means biasing said ejector arm toward its operative position, said ejector arm being so constructed and arranged that lumber moving along said trough which engages said ejector arm is deflected laterally off of said conveyor.

References Cited in the file of this patent

UNITED STATES PATENTS

| | | |
|---|---|---|
| 674,455 | Comly | May 21, 1901 |
| 769,567 | Rice | Sept. 6, 1904 |
| 1,220,799 | Tanner | Mar. 27, 1917 |
| 1,945,455 | Wallace | Jan. 30, 1934 |
| 1,986,427 | Denton | Jan. 1, 1935 |

FOREIGN PATENTS

| | | |
|---|---|---|
| 31,322 | Sweden | Apr. 22, 1910 |
| 315,750 | Great Britain | July 17, 1929 |